(12) United States Patent
Alanqari et al.

(10) Patent No.: US 11,466,192 B2
(45) Date of Patent: Oct. 11, 2022

(54) CEMENTS FOR OIL AND GAS CEMENTING APPLICATIONS

(71) Applicant: SAUDI ARABIAN OIL COMPANY, Dhahran (SA)

(72) Inventors: Khawlah A. Alanqari, Al-Khubar (SA); Abdullah Al-Yami, Dhahran (SA); Ali Al-Safran, Dhahran (SA); Vikrant Wagle, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 204 days.

(21) Appl. No.: 16/914,120

(22) Filed: Jun. 26, 2020

(65) Prior Publication Data
US 2021/0403792 A1 Dec. 30, 2021

(51) Int. Cl.
| | |
|---|---|
| *C09K 8/46* | (2006.01) |
| *C04B 14/28* | (2006.01) |
| *C04B 14/30* | (2006.01) |
| *C04B 22/00* | (2006.01) |
| *C04B 22/06* | (2006.01) |
| *C04B 28/06* | (2006.01) |
| *E21B 33/14* | (2006.01) |
| *C04B 111/00* | (2006.01) |

(52) U.S. Cl.
CPC ............... *C09K 8/46* (2013.01); *C04B 14/28* (2013.01); *C04B 14/308* (2013.01); *C04B 22/0093* (2013.01); *C04B 22/066* (2013.01); *C04B 28/06* (2013.01); *E21B 33/14* (2013.01); *C04B 2111/00146* (2013.01)

(58) Field of Classification Search
CPC ......... C04B 14/26; C04B 14/28; C04B 14/30; C04B 14/304; C04B 14/308; C04B 22/064; C04B 22/066; C04B 22/0093; C04B 28/02; C04B 28/06; C04B 28/188; C04B 2103/46; C04B 2103/408; C04B 2111/00146; C04B 2111/2015; C09K 8/46; C09K 8/467; E21B 33/14
See application file for complete search history.

(56) References Cited

U.S. PATENT DOCUMENTS

| | | | |
|---|---|---|---|
| 3,748,158 A | 7/1973 | Braniski et al. | |
| 4,235,291 A | 11/1980 | Messenger | |
| 5,547,024 A | 8/1996 | Di Lullo Arias | |
| 6,379,455 B1 | 4/2002 | Cohen | |
| 6,730,159 B1 | 5/2004 | Falaschi et al. | |
| 6,832,651 B2 | 12/2004 | Ravi et al. | |
| 7,219,733 B2 | 5/2007 | Luke et al. | |
| 9,505,659 B2 | 11/2016 | Bickbau | |
| 9,718,731 B2 | 8/2017 | Bullerjahn et al. | |
| 11,084,758 B1 * | 8/2021 | Alanqari | C09K 8/46 |
| 2004/0216644 A1 | 11/2004 | Morioka et al. | |
| 2009/0288830 A1 | 11/2009 | Perera et al. | |
| 2019/0284465 A1 | 9/2019 | Al-Yami et al. | |
| 2020/0131425 A1 | 4/2020 | Alsaihati et al. | |

FOREIGN PATENT DOCUMENTS

| | | |
|---|---|---|
| CN | 109293262 A | 2/2019 |
| CN | 110093901 A | 8/2019 |
| EA | 002673 B1 | 8/2002 |
| EP | 0642478 B1 | 5/2002 |
| EP | 2801557 A1 | 11/2014 |
| FR | 2788762 A1 | 7/2000 |

OTHER PUBLICATIONS

International Search Report for corresponding International Application No. PCT/US2020/041144, dated Mar. 19, 2021 (5 pages).
Written Opinion for corresponding International Application No. PCT/US2020/041144, dated Mar. 19, 2020 (7 pages).

* cited by examiner

*Primary Examiner* — Anthony J Green
(74) *Attorney, Agent, or Firm* — Osha Bergman Watanabe & Burton LLP

(57) ABSTRACT

A sulfate-resistant cement composition may contain calcium magnesium aluminum oxide silicate, brownmillerite, dolomite, periclase, and calcium aluminum oxide. The composition may contain the calcium aluminum oxide in an amount in the range of 0.01 to 2.0 wt. %. The composition may contain the brownmillerite in an amount of the range of 20 to 30 wt. %.

20 Claims, 8 Drawing Sheets

CEMENTS FOR OIL AND GAS CEMENTING APPLICATIONS

In well drilling processes, wellbores are commonly cemented, where the annulus between the casing and the wellbore wall is filled with cement, forming a cement sheath. However, widely-used cements, such as ordinary Portland cement, may react with sulfates. This reaction may weaken the concrete and cause it to expand. Specifically, calcium ions may be leached from the lime ingredients contained in the cement. The calcium ions react with the sulfate ions, eventually yielding ettringite. Given the large amounts of sulfates that may be present in soils, this phenomenon is often encountered in wellbore cementing applications.

Cements with low calcium aluminate may demonstrate better chemical resistance to sulfates, and be labelled as sulfate resistance cements (SRC). However, such cements may provide inferior physical properties to conventional compositions.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to sulfate-resistant cement compositions. The sulfate-resistant cement compositions may contain calcium magnesium aluminum oxide silicate, brownmillerite, dolomite, periclase, and calcium aluminum oxide. The compositions may contain the calcium aluminum oxide in an amount in the range of 0.01 to 2.0 wt. %.

In another aspect, embodiments disclosed herein relate to cementing slurries that include a cement composition, and water. The sulfate-resistant cement compositions may contain calcium magnesium aluminum oxide silicate, brownmillerite, dolomite, periclase, and calcium aluminum oxide. The composition may contain the calcium aluminum oxide in an amount in the range of 0.01 to 2.0 wt. %.

In a further aspect, embodiments disclosed herein relate to methods of cementing a wellbore. The methods include forming a cementing slurry by mixing water with a cement composition, pumping the cementing slurry to a selected location within the wellbore, and curing the cementing slurry at the selected location to give a concrete structure. The cement compositions may contain calcium magnesium aluminum oxide silicate, brownmillerite, dolomite, periclase, and calcium aluminum oxide. The composition may contain the calcium aluminum oxide in an amount in the range of 0.01 to 2.0 wt. %.

Other aspects and advantages of the claimed subject matter will be apparent from the following description and the appended claims.

DETAILED DESCRIPTION

Figure 1:
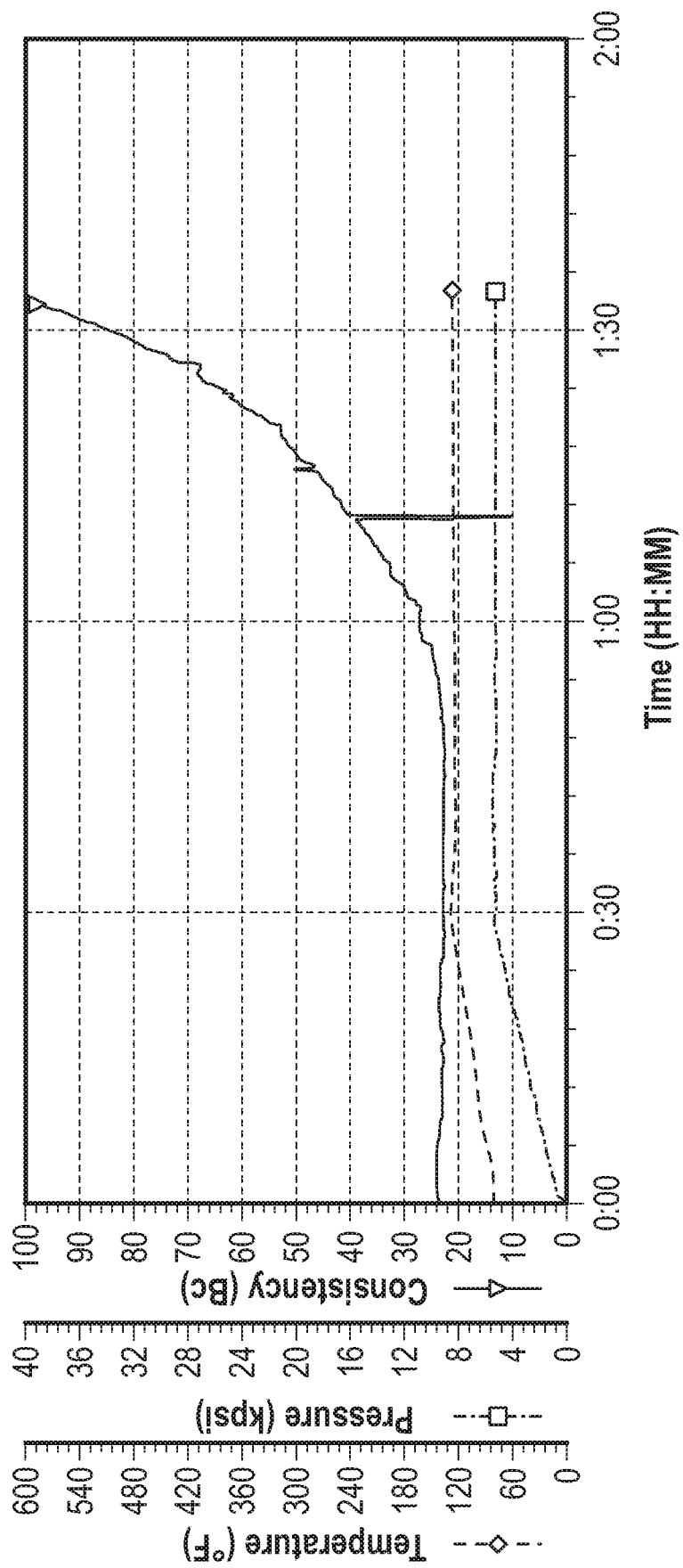
FIG. 1 is a graphical depiction of an API thickening test of an SRC of one or more embodiments.

Embodiments in accordance with the present disclosure generally relate to cement compositions, cement slurries, and concrete structures that are resistant to sulfates. The cement compositions, cement slurries, and concrete structures of one or more embodiments may be used as a sulfate resistant cement in oil and gas applications, and may provide improved wellbore integrity. Some embodiments in accordance with the present disclosure are directed to methods of cementing a wellbore.

Cementing is one of the most important operations in both drilling and completion of the wellbore. Primary cementing occurs at least once to secure a portion of the fluid conduit between the wellbore interior and the surface to the wellbore wall of the wellbore.

Primary cementing forms a protective solid sheath around the exterior surface of the introduced fluid conduit by positioning cement slurry in the wellbore annulus. Upon positioning the fluid conduit in a desirable location in the wellbore, introducing cement slurry into the wellbore fills at least a portion, if not all, of the wellbore annulus. When the cement slurry cures, the cement physically and chemically bonds with both the exterior surface of the fluid conduit and the wellbore wall, such as a geological formation, coupling the two. In addition, the solid cement provides a physical barrier that prohibits gases and liquids from migrating from one side of the solid cement to the other via the wellbore annulus. This fluid isolation does not permit fluid migration up-hole of the solid cement through the wellbore annulus. The cement compositions of one or more embodiments may provide one or more advantageous properties, such as expansion and mechanical properties, for use in wellbores.

In one or more embodiments, a cement composition in accordance with the present disclosure may contain calcium magnesium aluminum oxide silicate ($Ca_{54}MgAlSi_{16}O_{90}$). In some embodiments, the cement composition may contain the calcium magnesium aluminum oxide silicate in an amount of the range of about 45 to 60% by weight (wt. %). For example, the cement composition may contain the calcium magnesium aluminum oxide silicate in an amount of a range having a lower limit of any of 45, 48, 50, 52, and 53 wt. % to an upper limit of any of 53, 55, 57, and 60 wt. %, where any lower limit can be used in combination with any mathematically-compatible upper limit.

In one or more embodiments, the cement composition may contain brownmillerite ($Ca_2(Al,Fe)_2O_5$). In some embodiments, the cement composition may contain the brownmillerite in an amount of the range of about 20 to 30 wt. %. For example, the cement composition may contain the brownmillerite in an amount of a range having a lower limit of any of 20, 22, 24, and 25 wt. % to an upper limit of any of 25, 26, 28, and 30 wt. %, where any lower limit can be used in combination with any mathematically-compatible upper limit.

In one or more embodiments, the cement composition may contain dolomite ($CaMg(CO_3)_2$). In some embodiments, the cement composition may contain the dolomite in an amount of the range of about 5 to 15 wt. %. For example, the cement composition may contain the dolomite in an amount of a range having a lower limit of any of 5, 7, 9, and 10 wt. % to an upper limit of any of 10, 11, 13, and 15 wt. %, where any lower limit can be used in combination with any mathematically-compatible upper limit.

In one or more embodiments, the cement composition may contain periclase (MgO). In some embodiments, the cement composition may contain the periclase in an amount of the range of about 5 to 15 wt. %. For example, the cement composition may contain the periclase in an amount of a range having a lower limit of any of 5, 7, 9, and 10 wt. % to an upper limit of any of 10, 11, 13, and 15 wt. %, where any lower limit can be used in combination with any mathematically-compatible upper limit.

In one or more embodiments, the cement composition may contain little to no calcium aluminium oxide ($Ca_3Al_2O_6$). In some embodiments, the cement composition may contain the calcium aluminum oxide in an amount of 3 wt. % or less, 2 wt. % or less, or 1 wt. % or less. In some embodiments, the cement composition may contain the calcium aluminium oxide in an amount of a range having a lower limit of any of 0.01, 0.1, 0.2, 0.5, 1.0, 1.5, and 2.0 wt. % to an upper limit of any of 0.5, 1.0, 1.5, 2.0, 2.5, and 3.0 wt. %, where any lower limit can be used in combination with any mathematically-compatible upper limit.

In one or more embodiments, the cement composition may contain quartz in an amount of 1 wt. % or less, 0.5 wt. % or less, 0.1 wt. % or less, or 0.01 wt. % or less. In some embodiments, the cement composition may be free of quartz.

Cement compositions according to embodiments herein may have advantageous expansion and mechanical properties for use in wellbores. Further, while calcium aluminium oxide may be sulfate-reactive, calcium magnesium aluminium oxide silicate, dolomite, and other components of the cements herein may be non-reactive or minimally reactive with sulfates. The mixture of such components in cement compositions according to embodiments herein has further been found to be sulfate resistant.

A cement slurry of one or more embodiments may include water and a cement composition as discussed above. The water may include at least one of fresh water, seawater, and brine. The cement slurry may contain fresh water formulated to contain various salts. The salts may include, but are not limited to, alkali metal halides and hydroxides. In one or more embodiments, brine may be any of seawater, aqueous solutions wherein the salt concentration is less than that of seawater, or aqueous solutions wherein the salt concentration is greater than that of seawater. Salts that are found in seawater may include sodium, calcium, aluminum, magnesium, potassium, strontium, and lithium salts of halides, carbonates, chlorates, bromates, nitrates, oxides, phosphates, among others. Any of the aforementioned salts may be included in brine. In one or more embodiments, the density of the cement composition may be controlled by increasing the salt concentration in the brine, though the maximum concentration is determined by the solubility of the salt. In particular embodiments, brine may include an alkali metal halide or carboxylate salt and/or alkaline earth metal carboxylate salts.

In one or more embodiments, the cement slurry may contain the cement composition in an amount in the range of about 40 to 90 wt. % of the total weight of the cement slurry. For example, the cement slurry may contain the cement composition in an amount of a range from a lower limit of any of 40, 50, 60, 70, and 80 wt. % to an upper limit of any of 50, 60, 70, 80, and 90 wt. %, where any lower limit can be used in combination with any mathematically-compatible upper limit.

In one or more embodiments, the cement slurry may contain the water in an amount in the range of about 5 to 60 wt. % of the total weight of the cement slurry. For example, the cement slurry may contain the water in an amount of a range from a lower limit of any of 5, 10, 15, 20, 25, 30, 40 and 50 wt. % to an upper limit of any of 10, 20, 30, 40, 50, and 60 wt. %, where any lower limit can be used in combination with any mathematically-compatible upper limit.

In one or more embodiments, the cement slurry may further include one or more additives. In some embodiments, one such additive may be an expansion additive. The expansion additive of one or more embodiments may be used to improve the bonding of the cement to a wellbore. As a cement dehydrates its volume decreases, which may result in a separation or weakened bond between the cement and a casing or the cement and a geological formation. Expansion additives counteract this by increasing the volume of the cement and maintaining bonding during dehydration. At wellbore temperatures of 140° F. or greater, at least one of MgO, CaO, and mixtures thereof may be used as the expansion additive in the cement slurry. However, at temperatures less than 140° F., MgO may not expand quickly enough to provide adequate binding to the geological formation. Accordingly, at wellbore temperatures of less than 140° F., crystalline SiO, may be used as the expansion additive as it expands more quickly than MgO. In one or more embodiments, D174 (Schlumberger) may be used as a low-temperature expansion additive (for instance, at temperatures of less than 230° F.), Microbond L (Halliburton) may be used as a low-temperature expansion additive (such as, at temperatures less than 230° F.), Halliburton Microbond HT may be used as a high-temperature expansion additive (such as, at temperatures greater than 230° F.), and Schlumberger D 176 can be used as a high temperature expansion additive (such as, at temperatures greater than 230° F.)

In some embodiments, an additive may be a weighting agent. Weighting agents may include, for example, manganese oxide ($MnO_2$), manganese tetroxide ($Mn_3O_4$), hematite ($Fe_2O_3$), calcium carbonate ($CaCO_3$), and barium sulfate ($BaSO_4$), and mixtures thereof. In some embodiments, the additive may be a silica sand. The silica sand of one or more embodiments may have an average particle size in the range of about 80 to 120 microns.

In one or more embodiments, an additive may include a dispersant containing one or more anionic groups. For instance, the dispersant may include synthetic sulfonated polymers, lignosulfonates with carboxylate groups, organic acids, hydroxylated sugars, other anionic groups, or combinations thereof. The dispersant may render the cement slurry as more fluid-like, improving flowability and providing one or more of reduced turbulence at lesser pump rates, reduced friction pressure when pumping, reduced water content, and improved performance of fluid loss additives.

In one or more embodiments, an additive may include a fluid loss additive. In some embodiments, the fluid loss additive may include non-ionic cellulose derivatives such as hydroxyethylcellulose (HEC). In some embodiments, the fluid loss additive may be a non-ionic synthetic polymer (for example, polyvinyl alcohol or polyethyleneimine). In some embodiments, the fluid loss additive may be an anionic synthetic polymer, such as 2-acrylamido-2-methylpropane sulfonic acid (AMPS) or AMPS-copolymers. In some embodiments, the fluid loss additive may include bentonite, which may additionally viscosify the cement slurry and may, in some embodiments, cause retardation effects. The surfactant of one or more embodiments may reduce the surface tension of the aqueous phase of the cement slurry, thus reducing fluid loss.

In some embodiments, the fluid loss additive may contain a carboxylic fatty acid having from 16 to 18 carbon atoms, which may be used in combination with the surfactant to reduce fluid loss in the cement slurry. The carboxylic fatty acid may include any acids having formula the formula ROOH, in which R is a saturated or unsaturated, linear, or branched hydrocarbyl group having from 14 to 22 carbons. Examples of suitable carboxylic fatty acids include palmitic acid, palmitoleic acid, vaccenic acid, oleic acid, elaidic acid, linoleic acid, a-linolenic acid, y-linolenic acid, stearidonic acid, and combinations thereof.

The additives of one or more embodiments may also be selected from the group consisting of accelerators, retarders, extenders, and lost-circulation agents. In one or more embodiments, the cement slurry may contain the one or more additives in a total amount of 0.1 to 40 wt. %, based on the total weight of the cement slurry. For example, the cement slurry may contain the one or more additives in an amount of a range from a lower limit of any of 0.1, 0.5, 1, 2, 3, 5, 7, and 10 wt. % to an upper limit of any of 1, 2, 4, 5, 6, 8, 10, 20, 30, and 40 wt. %, where any lower limit can be used in combination with any mathematically-compatible upper limit.

The cement slurry of one or more embodiments may have an API thickening time of 90 minutes or more to a consistency of 50 Bc, under wellbore conditions (pressure and temperature). In some embodiments, the cement slurry may have an API thickening time of 90 minutes or more, 100 minutes or more, 110 minutes or more, 120 minutes or more, 240 minutes or more, or 360 minutes or more.

In one or more embodiments, the density of the cement slurry may be in the range of about 1.50 to 2.20 g/mL. For example, the cement slurry may have a density of a range from a lower limit of any of 1.50, 1.60, 1.70, 1.80, 1.90, and 2.00 g/mL to an upper limit of any of 1.80, 1.90, 2.00, 2.10, and 2.20 g/mL, where any lower limit can be used in combination with any mathematically-compatible upper limit.

In one or more embodiments, the yield point of the cement slurry may be in the range of about 50 to 120 lb/100 ft$^2$. For example, the cement slurry may have a yield point of a range from a lower limit of any of 50, 55, 60, 65, 70, 75, and 80 lb/100 ft$^2$ to an upper limit of any of 70, 75, 80, 85, 90, 100, 110, and 120 lb/100 ft$^2$, where any lower limit can be used in combination with any mathematically-compatible upper limit.

The cement slurry of one or more embodiments may form cement through curing or solidifying. As used herein, "curing" refers to providing adequate conditions (such as humidity, temperature, and time) to allow the concrete to achieve the desired properties (such as hardness) for its intended use through one or more reactions between the water and the cement composition. Curing may be a passive step where no physical action is needed (such as cement that cures in ambient conditions when untouched). In contrast, "drying" refers to merely allowing the concrete to achieve conditions appropriate for its intended use, which may only involve physical state changes, as opposed to chemical reactions. In some embodiments, curing the cement slurry may refer be passively allowing the cement slurry to harden or cure through allowing one or more reactions between the water and the cement composition. In some embodiments, suitable curing conditions may be ambient conditions. In or more embodiments, curing may also involve actively hardening or curing the cement slurry by, for instance, introducing a curing agent to the cement slurry, providing heat or air to the cement slurry, manipulating the environmental conditions of the cement slurry to facilitate reactions between the water and the cement precursor, a combination of these, or other such means.

In one or more embodiments, curing may occur at a relative humidity of greater than or equal to 50% in the cement slurry and a temperature of greater than or equal to 50° F., for a time period of from 1 to 14 days. For example, the cement slurry may cure at a relative humidity of 50% or more, 60% or more, 70% or more, 80% or more, or 90% or more. The cement slurry may be cured at temperatures of 50° F. or more, 70° F. or more, 90° F. or more, or 110° F. or more. The cement slurry may be cured for a duration of a range from a lower limit of any of 1, 2, 3, 4, and 7 days to an upper limit of any of 2, 5, 7, 10, and 14 days, where any lower limit can be used in combination with any mathematically-compatible upper limit.

Once the cement slurry is cured, the cured cement constitutes a cement structure. In one or more embodiments, the cement slurry is cured within a wellbore and the cement structure is located within the wellbore. The cement structure will have various properties that indicate the physical strength and flexibility of the cement structure.

For instance, Young's modulus can quantify the elasticity or stiffness of the cement structure within the wellbore and gives insight into the tensile strength of the cement structure. s ratio is a measure of transverse strain to axial strain, and measures the deformation capacity of the cement structure. The greater the deformation capacity (that is, the greater Poisson's ratio) the less likely the cement structure will be damaged as temperature and pressure changes within the wellbore. The Young's modulus and Poisson's ratio may be measured 10 days after curing the cement structure, 20 days after curing the cement structure, and 30 days after curing the cement structure.

In one or more embodiments, the static Young's modulus of the cement structure may be in the range of about 0.80 to $1.40 \times 10^6$ psi. For example, the cement structure may have a Young's modulus of a range from a lower limit of any of 0.80, 0.90, 0.95, 1.0, 1.05, 1.10, 1.20, 1.25, and $1.30 \times 10^6$ psi to an upper limit of any of 0.95, 1.0, 1.05, 1.10, 1.15, 1.20, 1.30, 1.35, and $1.40 \times 10^6$ psi, where any lower limit can be used in combination with any mathematically-compatible upper limit.

In one or more embodiments, the static Poisson's ratio of the cement structure may be in the range of about 0.120 to 0.140 psi. For example, the cement structure may have a static Poisson's ratio of a range from a lower limit of any of 0.120, 0.122, 0.124, 0.126, and 0.130 psi to an upper limit of any of 0.130, 0.132, 0.134, 0.136, and 0.140 psi, where any lower limit can be used in combination with any mathematically-compatible upper limit.

In one or more embodiments, the density of the cement structure may be in the range of about 1.80 to 2.20 g/mL. For example, the cement structure may have a density in a range from a lower limit of any of 1.80, 1.85, 1.90, 1.95, and 2.00 g/mL to an upper limit of any of 2.00, 2.05, 2.10, 2.15, and 2.20 g/mL, where any lower limit can be used in combination with any mathematically-compatible upper limit.

In one or more embodiments, the compressive strength of the cement structure may be 3000 psi or more, 4000 psi or more, or 5000 psi or more. In some embodiments, the compressive strength of the cement structure may be in the range of about 500 to 5000 psi. For example, the cement structure may have a compressive strength of a range from a lower limit of any of 500, 1000, 2000, 2500, 3000, 3500, and 4000 psi to an upper limit of any of 1000, 1500, 2000, 2500, 3000, 3500, 4000, 4500, and 5000 psi, where any lower limit can be used in combination with any mathematically-compatible upper limit.

The cement compositions, slurries, and concrete structures of the present disclosure may be used in oil and gas applications. In some embodiments, the compositions and methods disclosed herein may be used in wellbores. Specifically, a cement slurry may be prepared and pumped to a chosen location within the wellbore. The cement may cure within the wellbore, forming a concrete structure therewithin.

EXAMPLES

The following examples are merely illustrative and should not be interpreted as limiting the scope of the present disclosure.

The sulfate resistant cement composition of Example 1 was prepared. Analysis by X-ray diffraction revealed that the Example possessed the chemical composition reported in Table 1.

TABLE 1

Composition of Example 1

| Compound | Amount (wt. %) |
|---|---|
| Calcium magnesium aluminum oxide silicate-Ca54MgAl2Si16O90 | 53 |
| Brownmillerite | 25 |
| Dolomite-CaMg(CO3)2 | 10 |
| Periclase | 10 |
| Calcium aluminum oxide | 2 |
| Quartz | — |

A SRC slurry was prepared by mixing 342 g water with 800 g cement (Example 1). The slurry had a density of 120 pounds per cubic foot (pcf; 16.04 lb/gallon). An API thickening time test was performed under ramping of 28 minutes, a pressure of 5200 psi, and a temperature of 125° F., providing a thickening time of 95 minutes (see FIG. 1). The sample provided the rheology data exhibited in Table 2.

TABLE 2

Rheology of SRC

| 600 rpm | 130 |
|---|---|
| 300 rpm | 95 |
| 200 rpm | 78 |
| 100 rpm | 60 |
| 6 rpm | 20 |
| 3 rpm | 14 |
| 10 second gel strength (lb/100 ft$^2$) | 17 |
| 10 minute gel strength (lb/100 ft$^2$) | 40 |
| Plastic Viscosity (cP) | 35 |
| Yield Point (lb/100 ft$^2$) | 60 |

Figure 2:
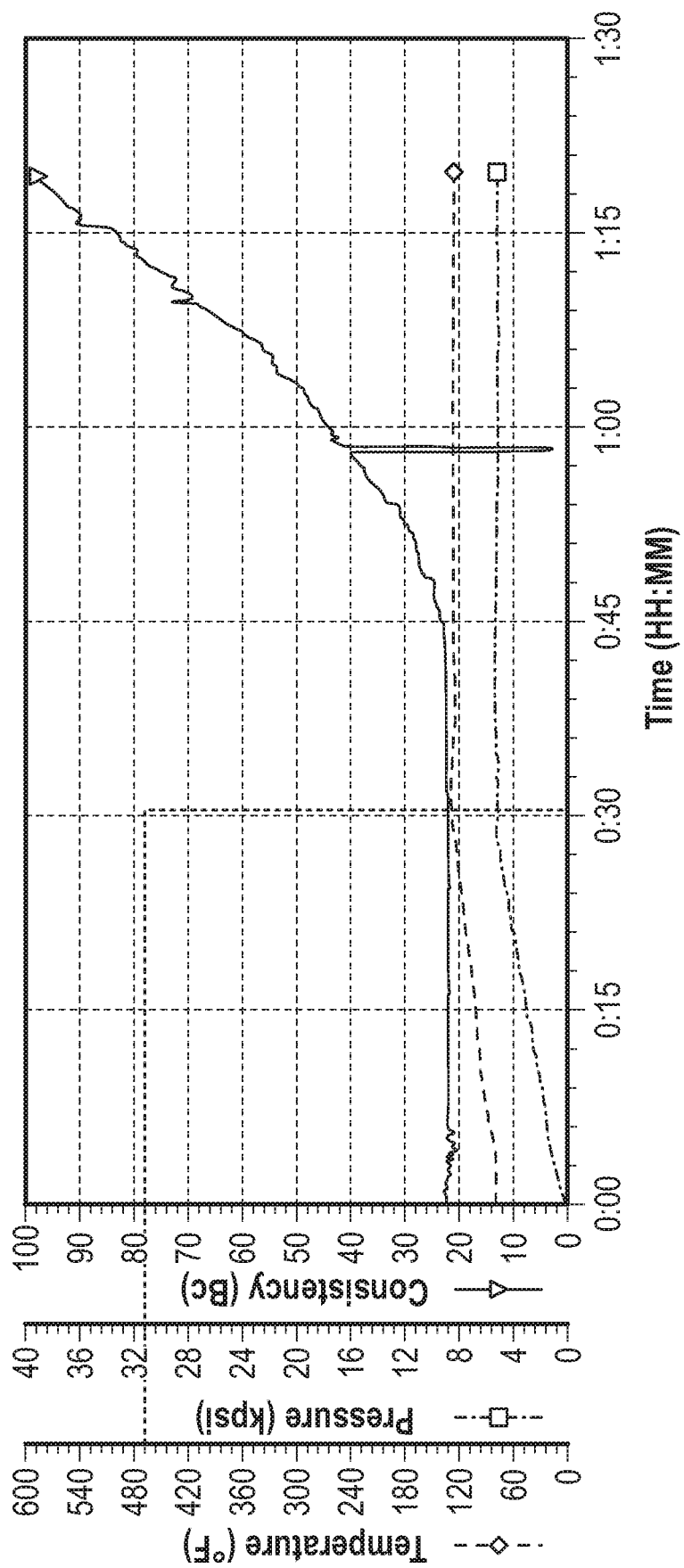
FIG. 2 is a graphical depiction of an API thickening test of an OPC of one or more embodiments.

A comparative ordinary Portland cement (OPC) slurry was prepared by mixing 337 g water with 800 g cement. The slurry had a density of 120 pounds per cubic foot (pcf; 16.04 lb/gallon). An API thickening time test was performed under the conditions outlined above, providing a thickening time of 82 minutes (see FIG. 2). The sample provided the rheology data exhibited in Table 3.

TABLE 3

Rheology of OPC

| 600 rpm | 134 |
|---|---|
| 300 rpm | 104 |
| 200 rpm | 89 |
| 100 rpm | 74 |
| 6 rpm | 25 |
| 3 rpm | 13 |
| 10 second gel strength (lb/100 ft$^2$) | 18 |
| 10 minute gel strength (lb/100 ft$^2$) | 28 |
| Plastic Viscosity (cP) | 30 |
| Yield Point (lb/100 ft$^2$) | 74 |

Figure 3:
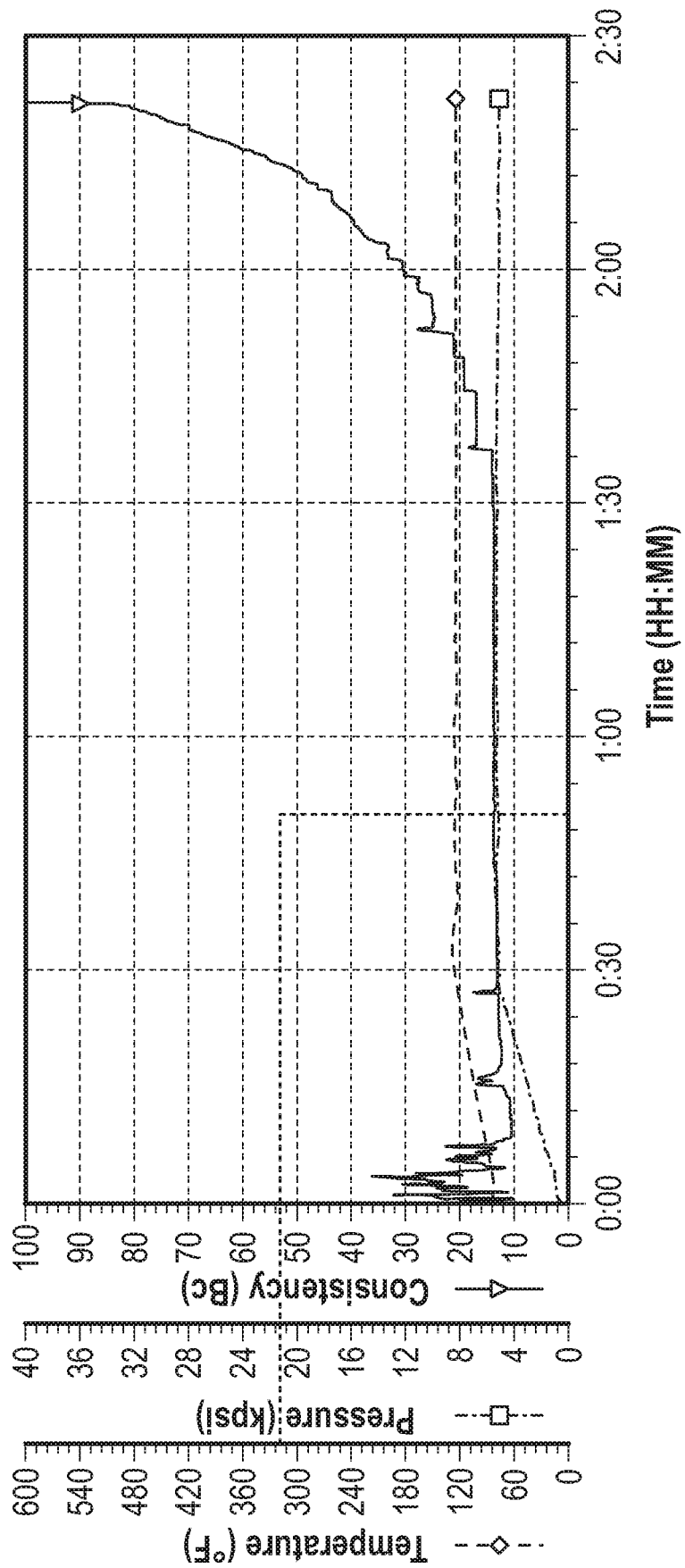
FIG. 3 is a graphical depiction of an API thickening test of an SRC of one or more embodiments with a retarder.
Figure 4:
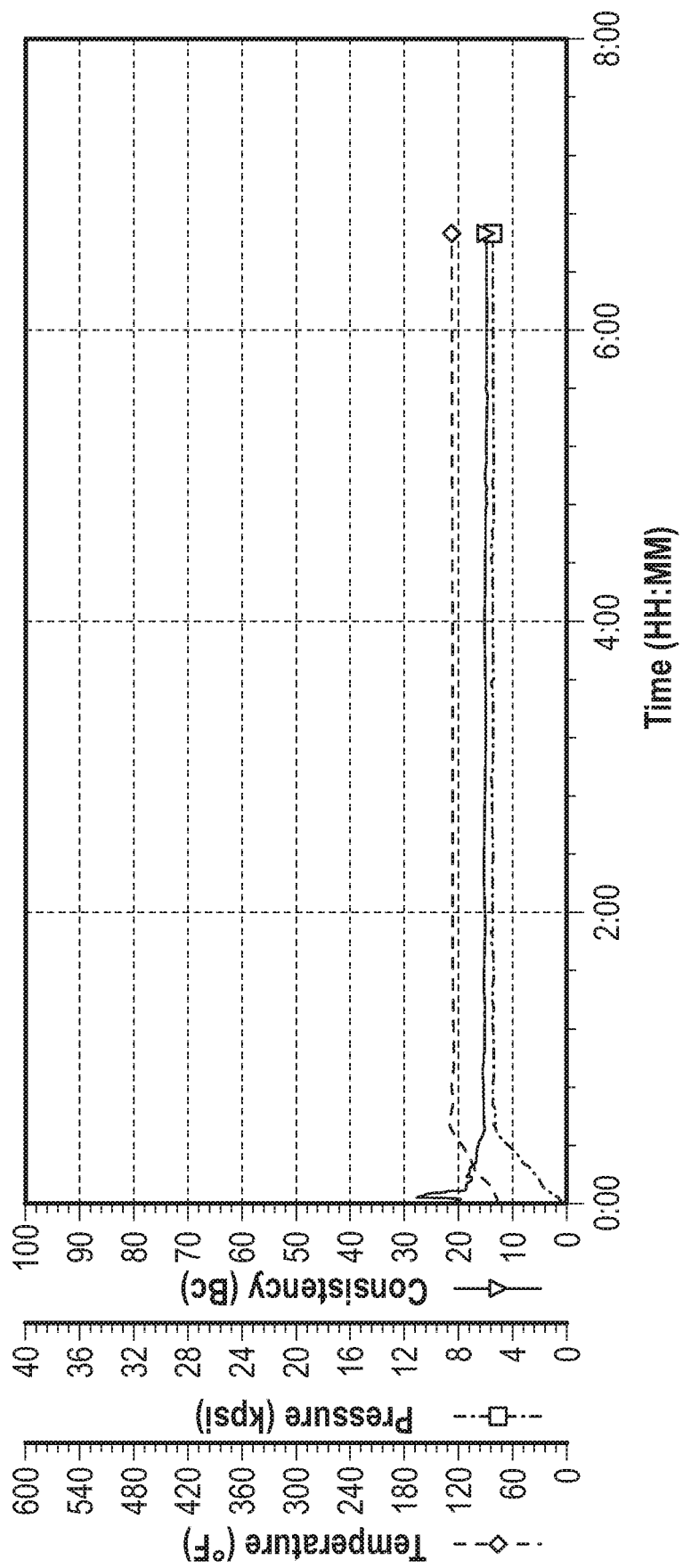
FIG. 4 is a graphical depiction of an API thickening test of an SRC of one or more embodiments with a retarder.
Figure 5:
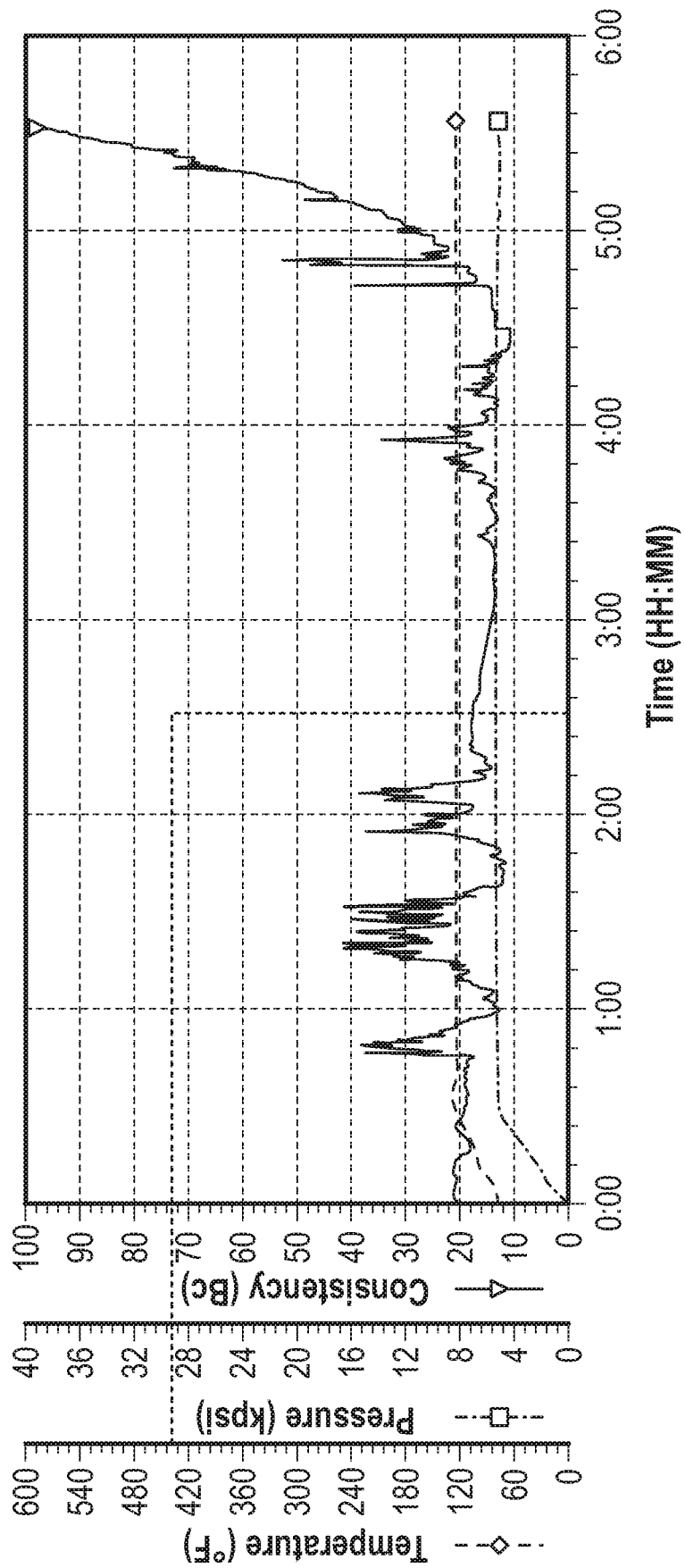
FIG. 5 is a graphical depiction of an API thickening test of an SRC of one or more embodiments with a retarder.

The retarder response of the SRC was measured to determine the length of time the slurry remains in a pumpable fluid state under simulated wellbore conditions (of temperature and pressure). The thickening time was measure in accordance with API RP 10B. The test slurry was evaluated in a pressurized consistometer. Three tests were performed using different amounts of retarder. The retarder was HR-5 (Halliburton). The results show excellent retarder response of SRC (see FIGS. 3-5 and Tables 4-6, below).

TABLE 4

Retarder Test 1 (342 g water, 2 g HR-5, 800 g SRC)

| Cement Type | SRC cement |
|---|---|
| Thickening Time | 2:21 |
| BHCT | 125° F. |
| Batch mixing | — |
| Test Temperature | 125° F. |
| Ramp Time | 28 min |
| Final Bourdon Consistency | 100 Bc |
| Pressure | 5200 psi |
| Density | 120 |

TABLE 5

Retarder Test 2 (342 g water, 4.8 g HR-5, 800 g SRC)

| Cement Type | SRC Cement |
|---|---|
| Thickening Time | 6:36 |
| BHCT | 125° F. |
| Batch mixing | — |
| Test Temperature | 125° F. |
| Ramp Time | 28 min |
| Final Bourdon Consistency | 14 Bc |
| Pressure | 5200 psi |
| Density | 120 |

TABLE 6

Retarder Test 3 (342 g water, 4 g HR-5, 800 g SRC)

| Cement Type | SRC Cement |
|---|---|
| Thickening Time | 5:32 |
| BHCT | 125° F. |
| Batch mixing | — |
| Test Temperature | 125° F. |
| Ramp Time | 28 min |
| Final Bourdon Consistency | 100 Bc |
| Pressure | 5200 psi |
| Density | 120 |

Figure 6A:
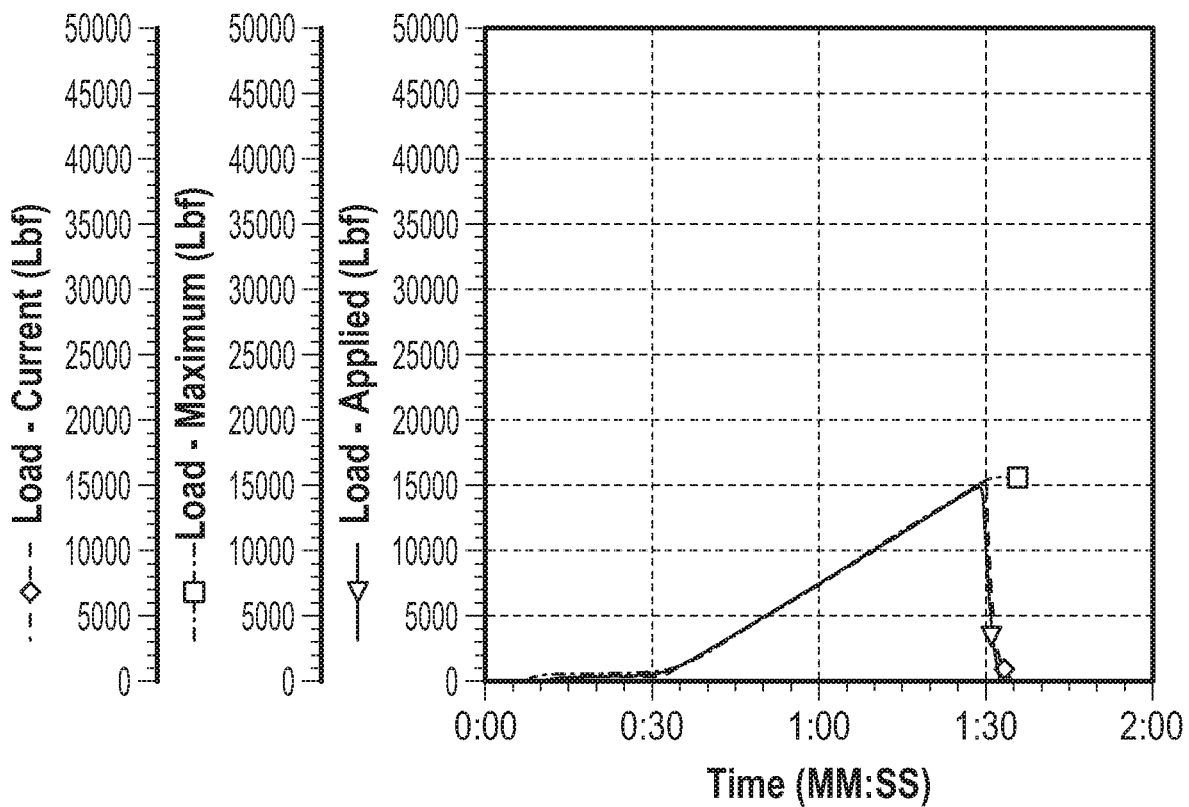
FIGS. 6A-C are graphical depictions of compressive strength tests of an SRC of one or more embodiments.
Figure 6B:
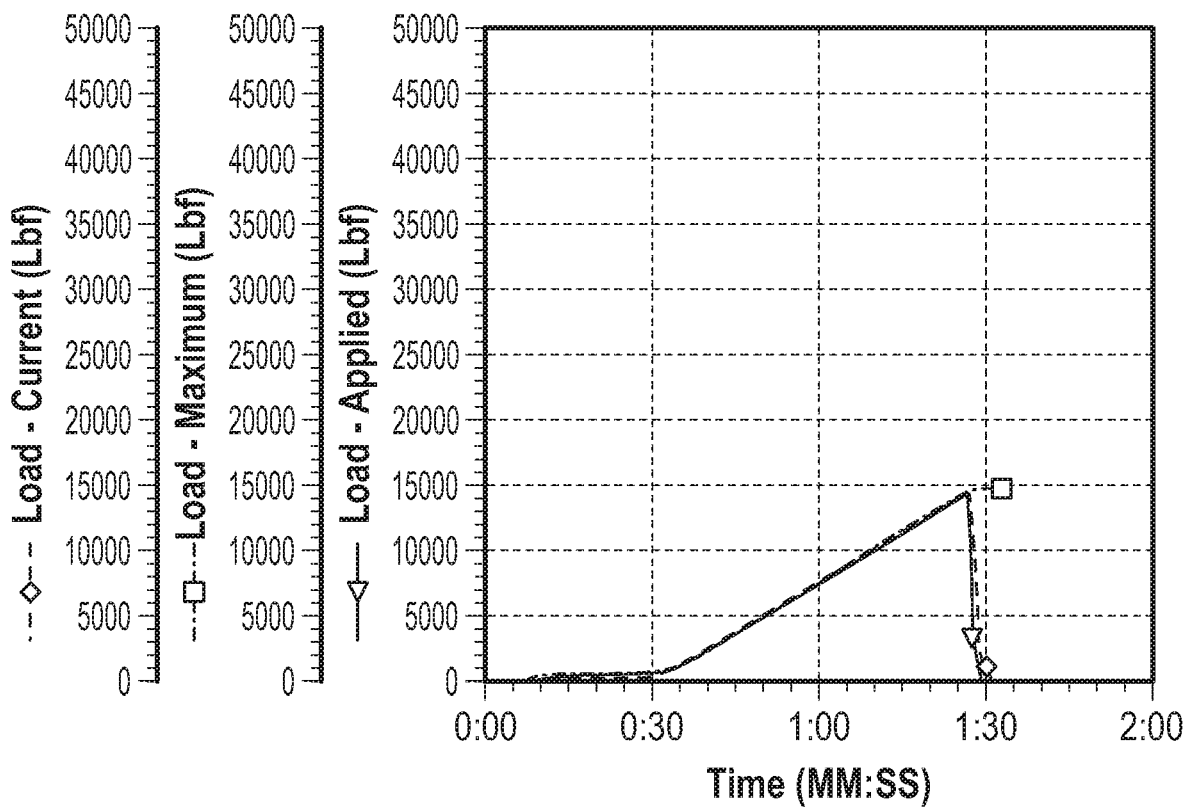
Figure 6C:
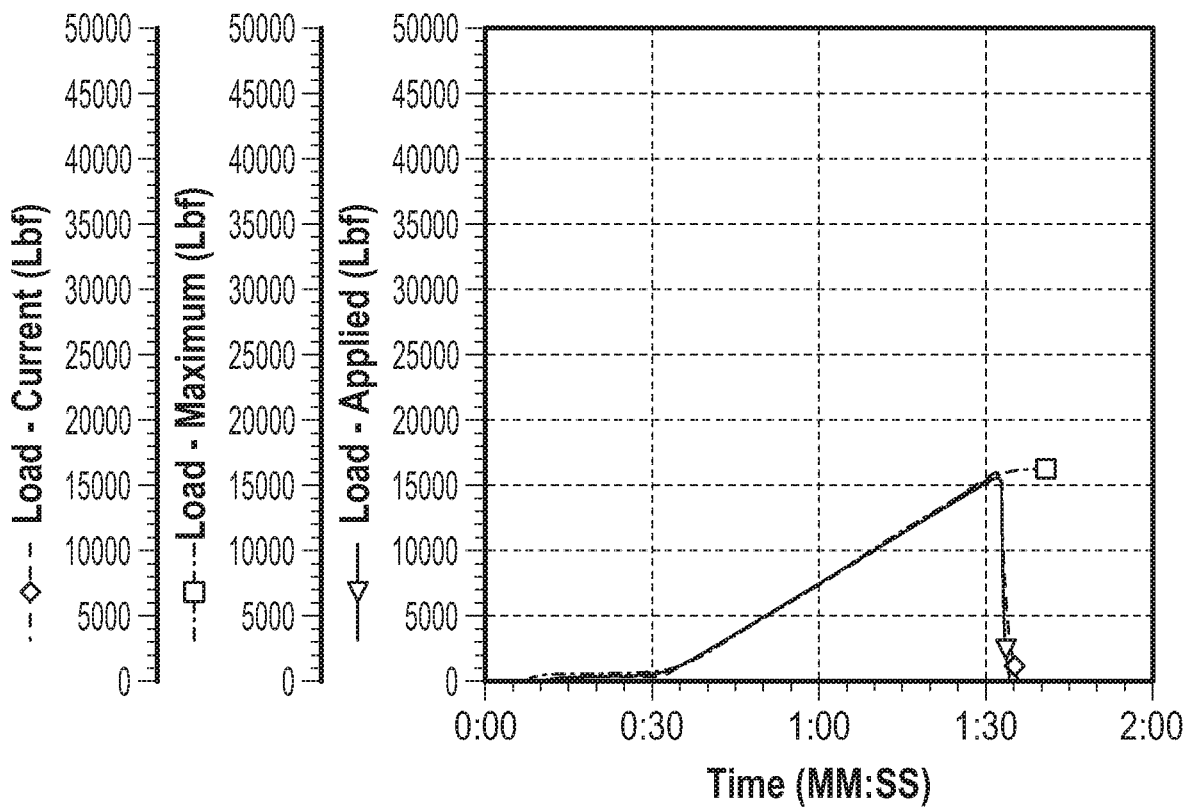
Figure 7A:
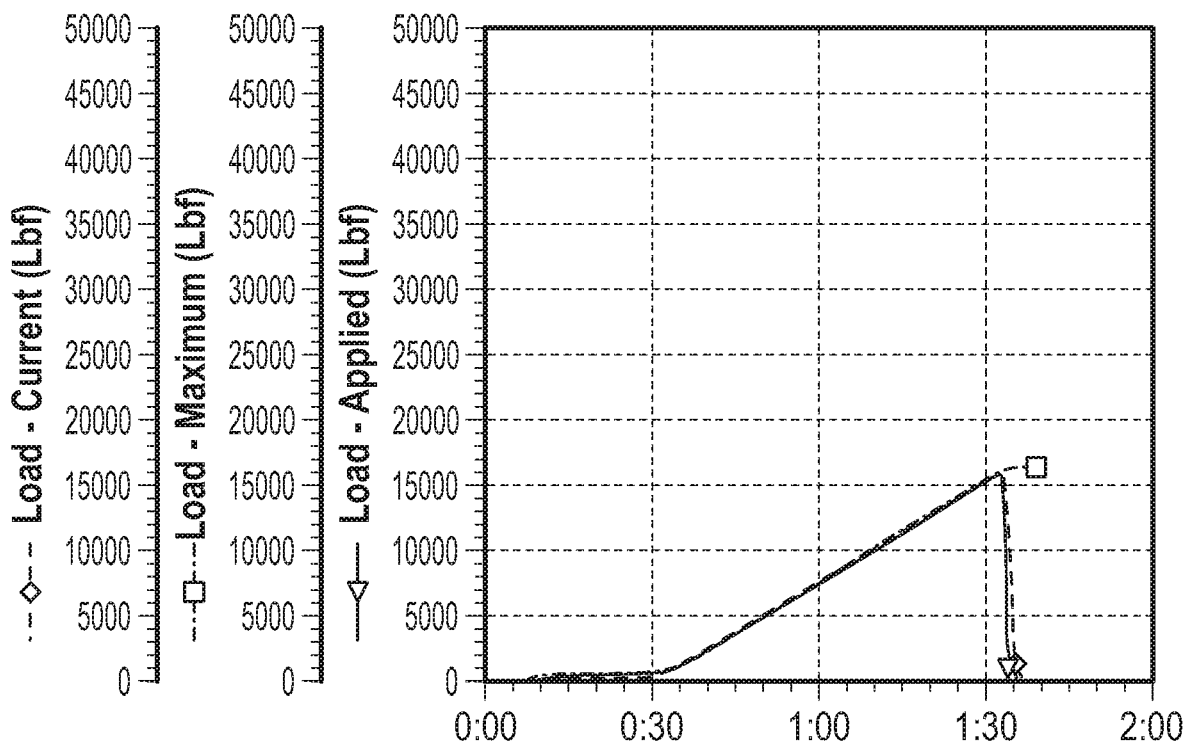
FIGS. 7A-C are graphical depictions of compressive strength tests of an OPC of one or more embodiments.
Figure 7B:
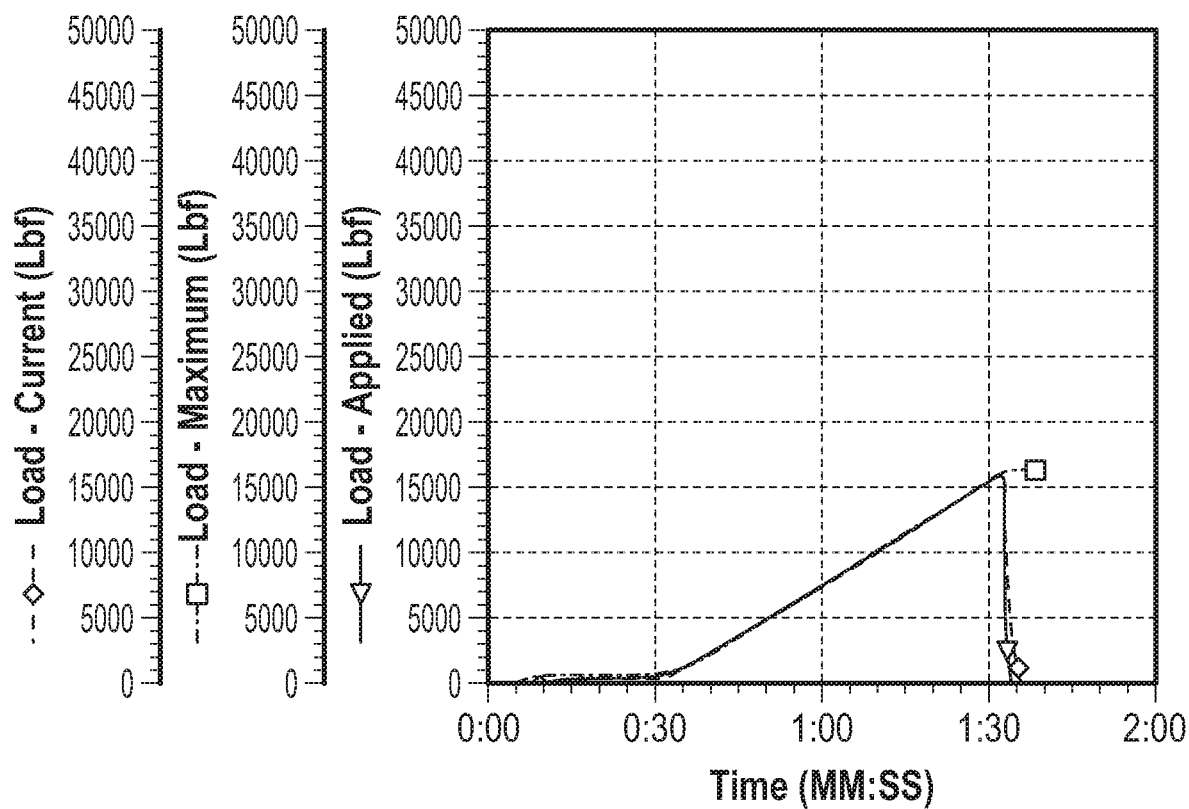
Figure 7C:
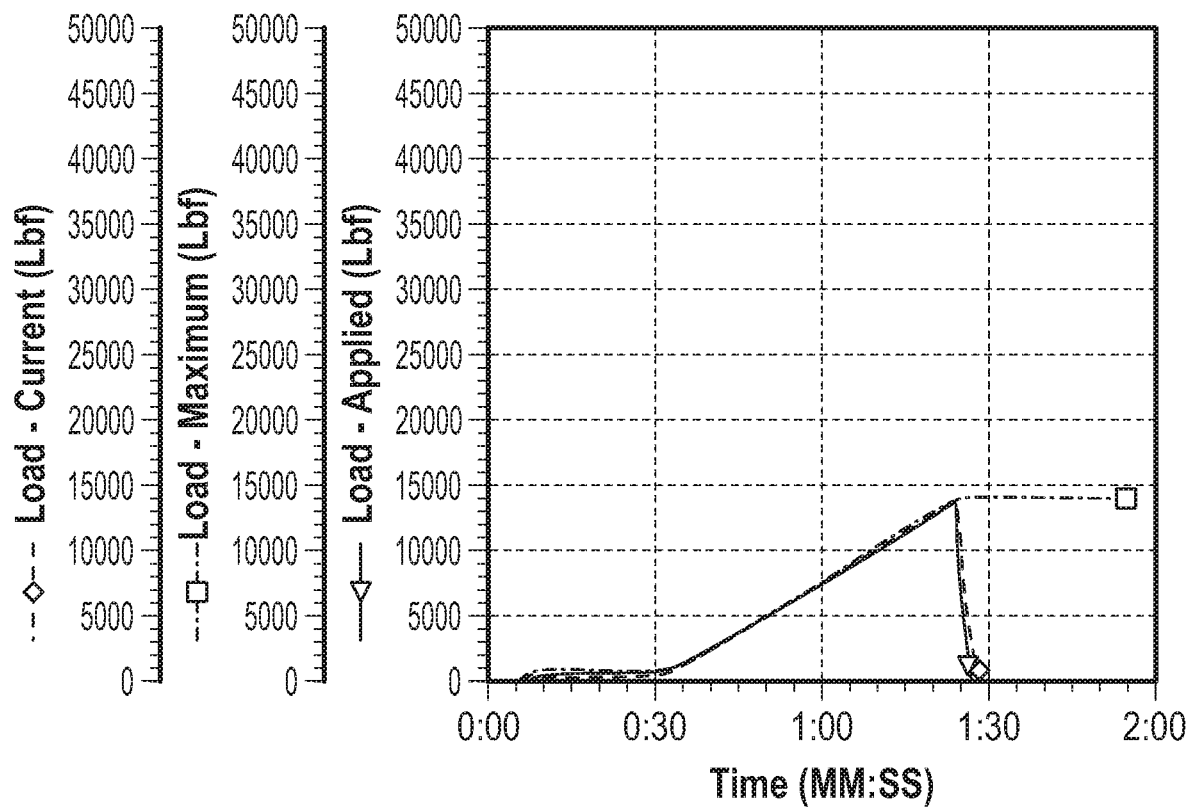

Compressive strength tests were performed on the exemplary SRC cement and the comparative OPC cement discussed above. The SRC cement provided an average compressive strength of 3871 psi (see FIGS. 6A-C) and the OPC cement provided an average compressive strength of 3861 psi (see FIGS. 7A-C).

Expansion tests were performed on the above-discussed SRC cement (and a conventional (comparative) Class G cement. The conventional Class G cement used contained 63 wt. % tricalcium silicate, 16.23 wt. % dicalcium silicate, 14.6 wt. % tetracalcium aluminoferrite, 2.5 wt. % tricalcium aluminate, 1.81 wt. % periclase, and 1.86% sulfur trioxide. Magnesium oxide was used as the expansion additive (Halliburton; Microbond HT). The expansion tests were performed at a temperature of 285° F., a pressure of 3000 psi, and a ramping of 2 hours.

TABLE 7

SRC Expansion Test (342 g water, 0.2 g D Air 300, 8 g MgO, 800 g SRC)

| Day | Measurement (mm) | Linear Expansion % | Comments |
| --- | --- | --- | --- |
| 0 | 11.242 | 0 | Water curing to make cement set |
| 1 | 14.734 | 1.250 | 285° F. |
| 2 | 17.73 | 2.323 | 285° F. |

TABLE 8

Class G Expansion Test (340.74 g water, 0.2 g D Air 300, 8.12 g MgO, 812.11 g Class G)

| Day | Measurement (mm) | Linear Expansion % | Comments |
| --- | --- | --- | --- |
| 0 | 11.144 | 0 | Water curing to make cement set |
| 1 | 11.9341 | 0.283 | 285° F. |
| 2 | 12.263 | 0.401 | 285° F. |

In addition to expansion test, the Young's modulus value of the exemplary SRC cement was compared with the comparative class G cement. For this test, the SRC cement and the class G cement were prepared with the same density (120 pcf) for comparison. They were mixed with water and 0.025 wt. % defoamer (D Air 380). These two cement formulations were cured in a curing chamber for 33 days at 3000 psi and 285° F.

It was found that the SRC has better Young's modulus value (static: $1.29 \times 10^6$ psi) compared to class G cement (static: $1.65 \times 10^6$ psi). The resulting Young's modulus value for the SRC (low value) is better than the class G cement (high value). This means the class G cement will more frequently fail under tensile stress than the inventive SRC, and will show more radial cracks that extend vertically along the wellbore. Also, the Class G cement will be more susceptible than the inventive SRC to temperature increases, which may produce an outward expansion of the casing due to thermal dilation. This expansion may create tensile cracks in the cement.

The SRC of the present disclosure therefore shows an excellent API thickening time test result, with a thickening time longer than that of an OPC. The SRC also exhibits a superb compressive strength of higher than 3700 psi (and even higher than the comparative OPC). In addition, the proposed SRC provides better expansion results as compared to a conventional Class G cement. With the same amount of expansion additive, the SRC is able to expand six times as much as the Class G cement. The proposed SRC also provides a superior Young's modulus than the conventional Class G cement.

Although the preceding description has been described herein with reference to particular means, materials and embodiments, it is not intended to be limited to the particulars disclosed herein; rather, it extends to all functionally equivalent structures, methods and uses, such as are within the scope of the appended claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A sulfate-resistant cement composition, comprising:
    calcium magnesium aluminum oxide silicate;
    brownmillerite;
    dolomite;
    periclase; and
    calcium aluminum oxide,
    wherein the composition contains the calcium aluminum oxide in an amount of the range of 0.01 to 2.0 wt. %.

2. The composition according to claim 1, wherein the composition contains the brownmillerite in an amount of the range of 20 to 30 wt. %.

3. The composition according to claim 1, wherein the composition contains the dolomite in an amount of the range of 5 to 15 wt. %.

4. The composition according to claim 1, wherein the composition contains the periclase in an amount of the range of 5 to 15 wt. %.

5. The composition according to claim 1, wherein the composition is free of quartz.

6. A cementing slurry, comprising:
    a cement composition that comprises calcium magnesium aluminum oxide silicate, brownmillerite, dolomite, periclase; and calcium aluminum oxide; and
    water;
    wherein the cement composition contains the calcium aluminum oxide in an amount in the range of 0.01 to 2.0 wt. %.

7. The cementing slurry according to claim 6, wherein the cement slurry contains the cement composition in an amount in the range of about 40 to 90 wt. %.

8. The cementing slurry according to claim 6, wherein the cementing slurry contains one or more additives selected from the group consisting of expansion additives, weighting agents, dispersants, and fluid loss additives.

9. The cementing slurry according to claim 6, wherein the cement composition contains the brownmillerite in an amount of the range of 20 to 30 wt. %.

10. The cementing slurry according to claim 6, wherein the cement composition contains the dolomite in an amount of the range of 5 to 15 wt. %.

11. The cementing slurry according to claim 6, wherein the cement composition contains the periclase in an amount of the range of 5 to 15 wt. %.

12. The cementing slurry according to claim 6, wherein the cement composition is free of quartz.

13. A method of cementing a wellbore, comprising:
forming a cementing slurry by mixing water with a cement composition that comprises calcium magnesium aluminum oxide silicate, brownmillerite, dolomite, periclase; and calcium aluminum oxide;
pumping the cementing slurry to a selected location within the wellbore; and
curing the cementing slurry at the selected location to give a concrete structure, wherein the cement composition contains the calcium aluminum oxide in an amount in the range of 0.01 to 2.0 wt. %.

14. The method according to claim 13, wherein the concrete structure has a compressive strength of 3000 psi or more.

15. The method according to claim 13, wherein the cement composition contains the brownmillerite in an amount of the range of 20 to 30 wt. %.

16. The method according to claim 13, wherein the cement composition contains the dolomite in an amount of the range of 5 to 15 wt. %.

17. The method according to claim 13, wherein the cement composition contains the periclase in an amount of the range of 5 to 15 wt. %.

18. The method according to claim 13, wherein the cement composition is free of quartz.

19. The method according to claim 13, wherein the cement slurry contains the cement composition in an amount in the range of about 40 to 90 wt. %.

20. The method according to claim 13, wherein the cement slurry contains one or more additives selected from the group consisting of expansion additives, weighting agents, dispersants, and fluid loss additives.

* * * * *